(12) United States Patent
Awano et al.

(10) Patent No.: US 8,122,588 B2
(45) Date of Patent: Feb. 28, 2012

(54) METHOD OF MANUFACTURING COIL ASSEMBLY OF STATOR OF ELECTRIC ROTATING MACHINE

(75) Inventors: Shinichi Awano, Kiyosu (JP); Akito Akimoto, Kariya (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 374 days.

(21) Appl. No.: 12/489,729

(22) Filed: Jun. 23, 2009

(65) Prior Publication Data

US 2009/0313810 A1    Dec. 24, 2009

(30) Foreign Application Priority Data

Jun. 23, 2008   (JP) ................................. 2008-163858

(51) Int. Cl.
    *H02K 15/04* (2006.01)
(52) U.S. Cl. ............................ 29/596; 29/602.1; 29/825
(58) Field of Classification Search ................... 29/596, 29/602.01, 825, 602.1
    See application file for complete search history.

(56) References Cited

U.S. PATENT DOCUMENTS

| 4,739,643 | A  | * | 4/1988 | Kuriyama et al. | ............... 72/306 |
| 6,841,913 | B2 | * | 1/2005 | Gorohata et al. | ............. 310/180 |
| 7,143,501 | B2 |   | 12/2006 | Bramson et al. | |
| 2001/0019234 | A1 | | 9/2001 | Murakami et al. | |
| 2004/0040142 | A1 | | 3/2004 | Hirota et al. | |
| 2006/0005376 | A1 | | 1/2006 | Hirota et al. | |

FOREIGN PATENT DOCUMENTS

| JP | 2002-176752 | 6/2002 |
| JP | 2004-104841 | 4/2004 |

* cited by examiner

*Primary Examiner* — Livius R Cazan
(74) *Attorney, Agent, or Firm* — Nixon & Vanderhye PC

(57) ABSTRACT

The method is for manufacturing a coil assembly of a stator of an electric rotating machine constituted by a plurality of interlaced coil wires each including a plurality of in-slot portions and a plurality of turn portions each of which connects adjacent two of the in-slot portions. The method includes a setting step of setting coil wires such that they are located on a circle and extend in parallel, and a plurality of shaping steps performed repeatedly for interlacing the coil wires into a doughnut shape.

5 Claims, 20 Drawing Sheets

METHOD OF MANUFACTURING COIL ASSEMBLY OF STATOR OF ELECTRIC ROTATING MACHINE

CROSS-REFERENCE TO RELATED APPLICATION

This application is related to Japanese Patent Applications No. 2008-163858 filed on Jun. 23, 2008, the contents of which are hereby incorporated by reference.

BACKGROUND OF THE INVENTION

1. Field of the Invention

The present invention relates to a method of manufacturing a coil assembly of a stator of an electric rotating machine.

2. Description of Related Art

There are known various methods of manufacturing a coil assembly of an electric rotating machine. For example, Japanese Patent Application Laid-open No. 2002-176752 discloses a method in which a plurality of coil wires are wound at the same time by use of a pair of opposed plate-like wiring cores. Also, Japanese Patent Application Laid-open No. 2004-104841 discloses a method in which there are repeatedly performed a first step where with respect to one coil wire formed in a triangular wave shape by a winding step, another coil wire is turned by 90 degrees on its axis, and advanced toward the one coil wire to thereby increase their overlapped portions by a half-turn, and a second step where the another coil wire is further turned on its axis, in order that a plurality of coil wires each having a plurality of turn portions are interlaced.

Interlacing a plurality of coil wires each having a plurality of turn portions with one another can be performed also by other methods. Such methods include a method in which around one fixed coil wire, another coil wire is moved by one revolution so that it advances in the coil longitudinal direction by one coil pitch as performed in a typical twinning device, and a method in which two coil wires are held at predetermined angles with respect to their interlacing portions, and are moved around with each other in this state.

However, since these methods use coil wires each having a plurality of turn portions formed by a shaping process, the angle between the axis of one coil wire and the axis of another coil wire has to be set to a large value in order to avoid interference between their turn portions during an interlacing process. This causes a problem that the coil wires (particularly, their linear in-slot portions) deform easily. If the coil wires deform during the interlacing process, the interlaced coil assembly has a warped shape.

SUMMARY OF THE INVENTION

The present invention provides a method of manufacturing a coil assembly of a stator of an electric rotating machine constituted by a plurality of interlaced coil wires each including a plurality of in-slot portions and a plurality of turn portions each of which connects adjacent two of the in-slot portions, the method comprising:

a setting step of setting first to n-th (n being an integer larger than or equal to 2) coil wires such that the first to n-th coil wires extend straight in an axial direction perpendicular to a predetermined circle and spaced from one another along a circumferential direction of the circle;

a first shaping step of bending the first coil wire at a first portion thereof along a predetermined direction, and at a second portion thereof distant from the first portion by a predetermined distance so as to extend along the axial direction, to thereby form a first in-slot portion in the first coil wire;

a second shaping step of sequentially bending the second to n-th coil wires at respective first portions thereof which are offset in the axial direction from the first portion of the first coil wire so as to intersect with the first in-slot portion of the first coil wire, and at respective second portions thereof distant respectively from the first portions of the second to n-th coil wires by a predetermined distance so as to extend along the axial direction, to thereby form respective first in-slot portions in the second to n-th coil wires;

a third shaping step of bending the first coil wire at a third portion thereof distant from the second portion of the first coil wire by a predetermined distance toward the first portion of the first coil wire, and at a fourth portion thereof distant form the third portion of the first coil wire by a predetermined distance so as to extend along the axial direction to thereby form a second in-slot portion in the first coil wire; and a fourth shaping step of sequentially bending the second to n-th coil wires at respective third portions thereof which are offset in the axial direction from the first portion of the first coil wire so as to intersect with the second in-slot portion of the first coil wire, and at respective fourth portions thereof distant respectively from the third portions of the second to n-th coil wires by a predetermined distance so as to extend along the axial direction, to thereby form respective second in-slot portions in the second to n-th coil wires.

The first to fourth shaping steps of the method of the invention described above are explained briefly by an example where the coil assembly is constituted by two coil wires (a first coil wire coil 1 and a second coil wire 2) with reference to FIG. 8. In the first shaping step, the first coil wire 1 extending in an axial direction (in the rightward direction in FIG. 8) is bent at a portion a1 thereof along a predetermined direction (along the left downward direction in FIG. 8), and at a second portion b1 thereof distanced from the first portion a1 by a predetermined distance so as to extend along the axial direction. As a result, a first in-slot portion A1 is formed between the portions a1 and b1.

In the second shaping step, the second coil wire 2 is bent at a portion a2 thereof which is offset in the axial direction from the portion a1 by a predetermined distance so as to cross the first in-slot portion A1, and at a portion b2 thereof so as to extend along the axial direction. As a result, a first in-slot portion A2 is formed between the portions a2 and b2.

In the third shaping step, the first coil wire 1 is bent at a portion c1 thereof toward the portion a1, and at a portion d1 distant from the portion c1 by a predetermined distance so as to extend along the axial direction. As a result, a second in-slot portion B1 is formed between the portions c1 and d1. The portions c1 and d1 of the first coil wire 1 are situated closer to axial ends (rightward ends in FIG. 8) of the coil wires than the portions a2 and b2 of the second coil wire. Between the portions b1 and c1 of the first coil wire 1, a turn portion T1 is formed.

In the fourth shaping step, the second coil wire 2 is bent at a portion c2 thereof which is offset in the axial direction from the portion c1 by a predetermined distance so as to cross the second in-slot portion B1, and at a portion d2 so as to extend along the axial direction. As a result, a second in-slot portion B2 is formed between the portions c2 and d2. Between the portions b2 and c2 of the second coil wire 2, a turn portion T2 is formed.

After completion of the fourth shaping step, the first to fourth shaping steps are repeated to bend the first coil wire 1 at portions e1, f1 and g1 thereof, and bend the second coil wire 2 at portions e2, f2 and g2, in order that the first and second coil wires 1 and 2 are formed in a predetermined shape including in-slot portions and turn portions over their entire lengths with the turn portions of the first and second coil wires 1 and 2 being interlaced.

According to the present invention, it is possible to prevent coil wires from being deformed when they are interlaced to a coil assembly.

Other advantages and features of the invention will become apparent from the following description including the drawings and claims.

PREFERRED EMBODIMENTS OF THE INVENTION

Figure 1A:
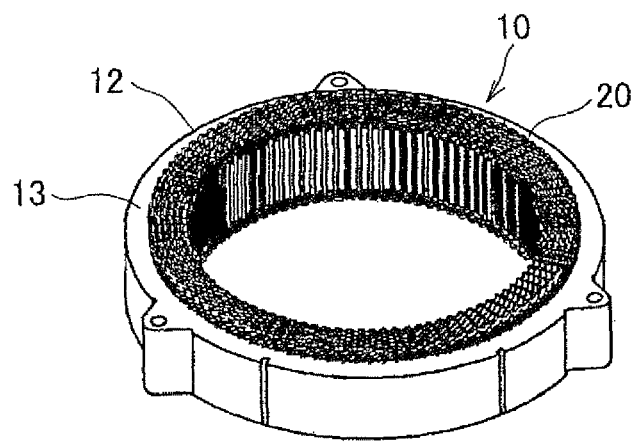
FIG. 1A is a perspective view of a stator including a coil assembly manufactured by a manufacturing method according to an embodiment of the invention.
Figure 1B:
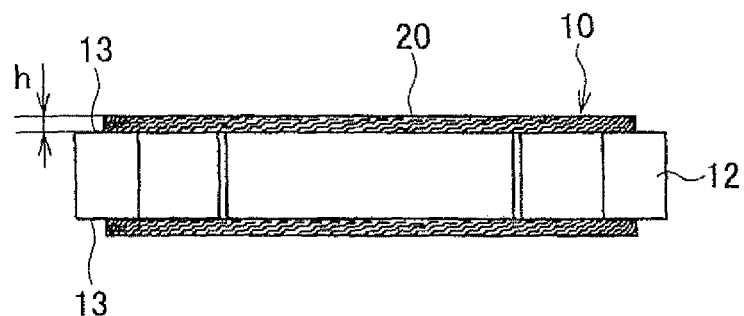
FIG. 1B is a side view of the stator.
Figure 2:
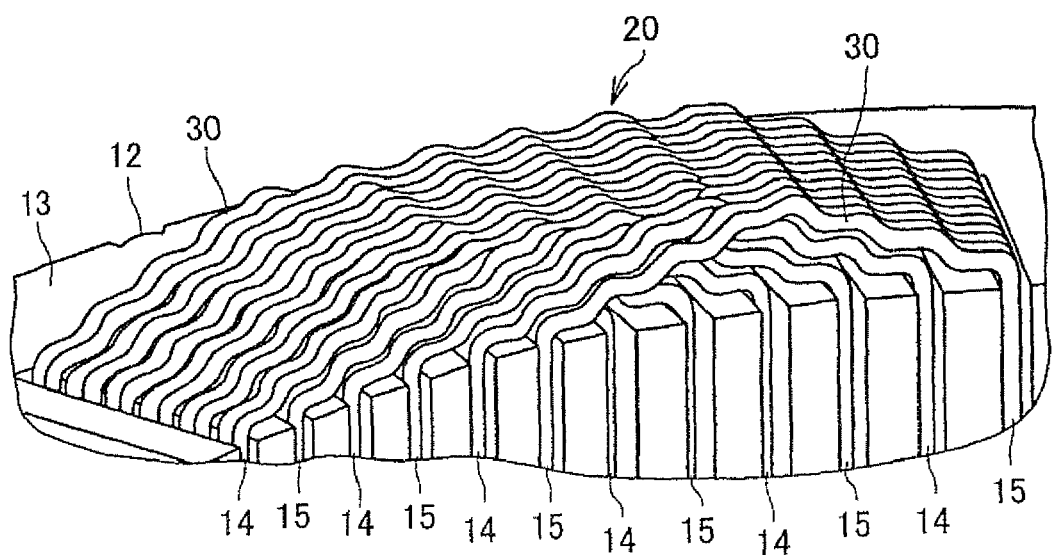
FIG. 2 is a partially enlarged view of the stator.

Prior to describing a method of manufacturing a coil assembly of an electric rotating machine according to an embodiment of the invention, the structure of a stator 10 of an electric rotating machine including a coil assembly 20 manufactured by the method according to the embodiment of the invention is explained. FIG. 1A is a perspective view of the stator 10 including the coil assembly 20, and FIG. 1B is a side view of the stator 10. FIG. 2 is a partially enlarged view of the stator 10.

The stator 10 is used in an electric rotating machine which operates as both a motor and an alternator, for example. A rotor (not shown) is rotatably disposed in the stator 10. The rotor includes permanent magnets on its outer periphery facing the inner periphery of the stator 10 disposed such that different polarities alternate in its circumferential direction. The stator 10 includes a cylindrical stator core 12 formed of magnetic steel plates of a predetermined thickness laminated in its axial direction. As shown in FIG. 2, the stator core 12 has a plurality of circumferentially-adjacent slot pairs formed in its inner periphery so as to be arranged in the circumferential direction, each circumferentially-adjacent slot pair including slots 14 and 15 extending in the axial direction. The coil assembly 20 is a three-phase winding. The phase windings of the coil assembly 20 are disposed in the slot pairs 14 and 15 such that the windings of three different phases are disposed in circumferentially adjacent three slot pairs.

Figure 3:
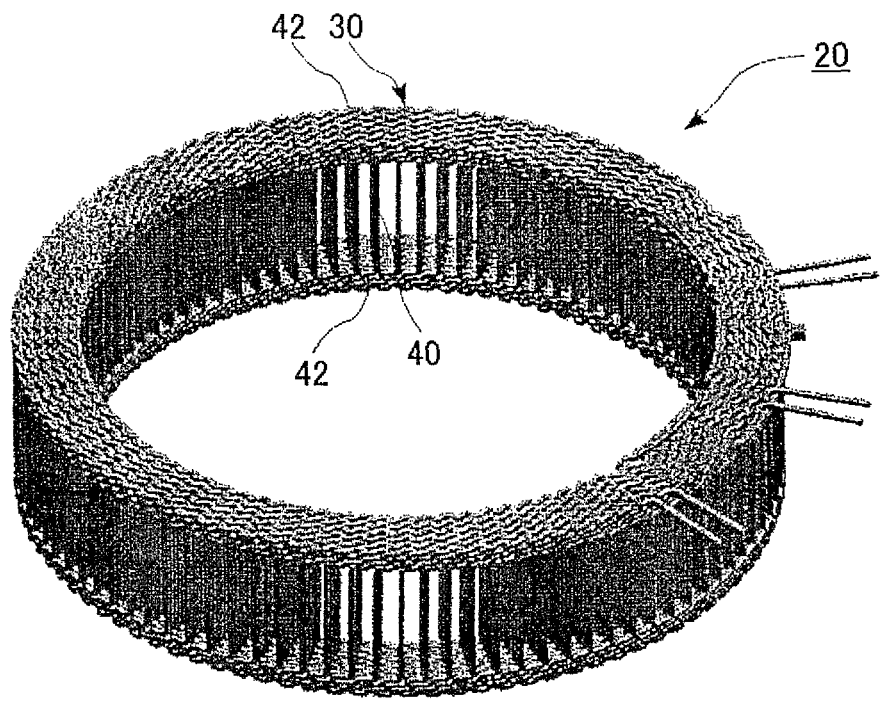
FIG. 3 is a perspective view showing an external appearance of the coil assembly.
Figure 4:
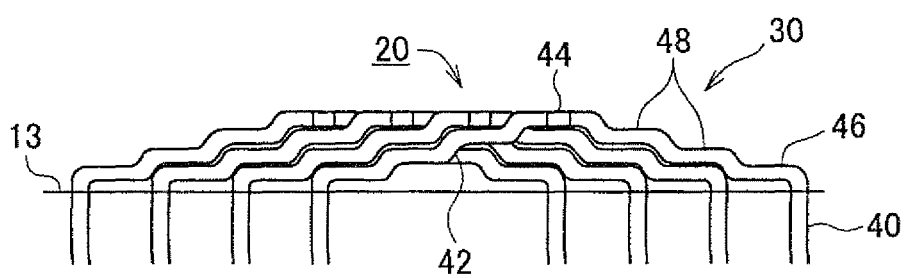
FIG. 4 is a front view of a coil end portion of the coil assembly.
Figure 5:
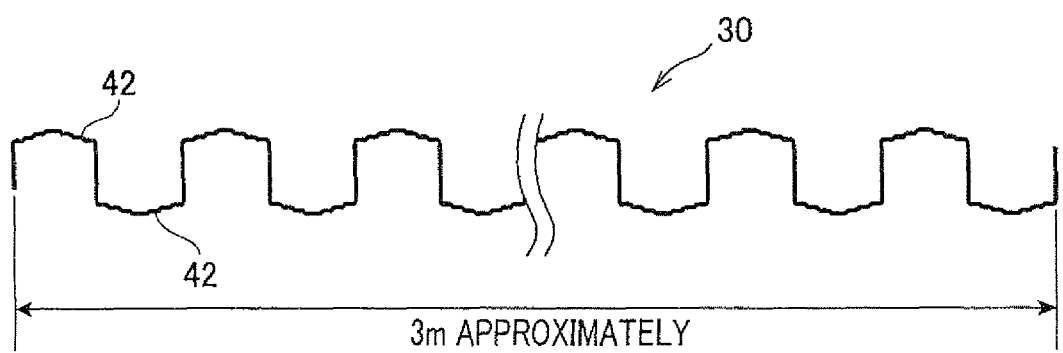
FIG. 5 is a front view showing the overall shape of one of coil wires constituting the coil assembly.
Figure 6:
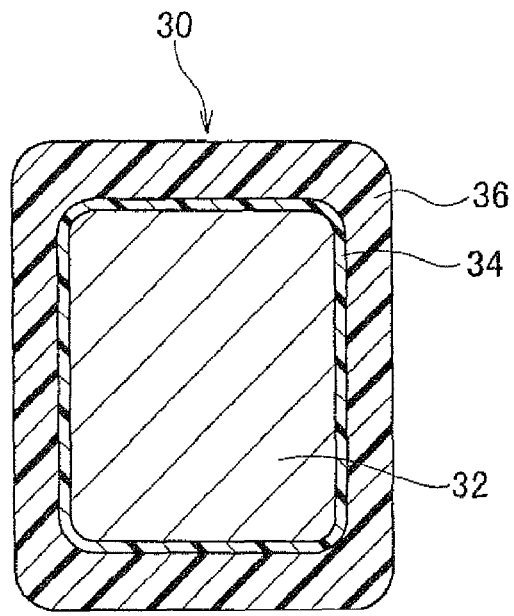
FIG. 6 is a cross-sectional view of the coil wire.
Figure 7:
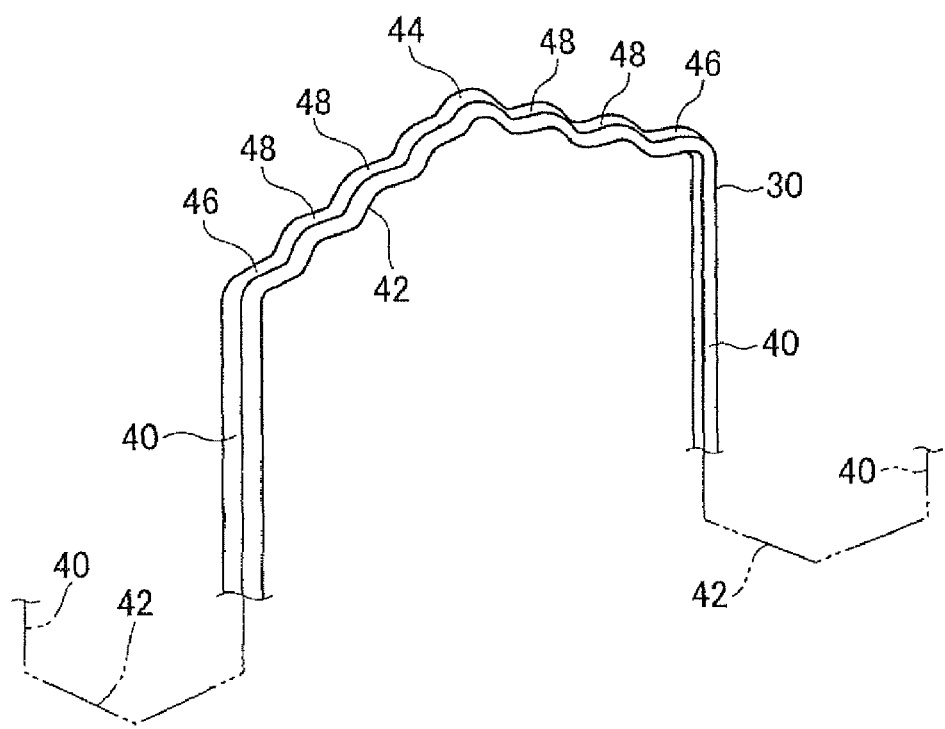
FIG. 7 is a perspective view showing the shape of a turn portion of the coil wire.
Figure 8:
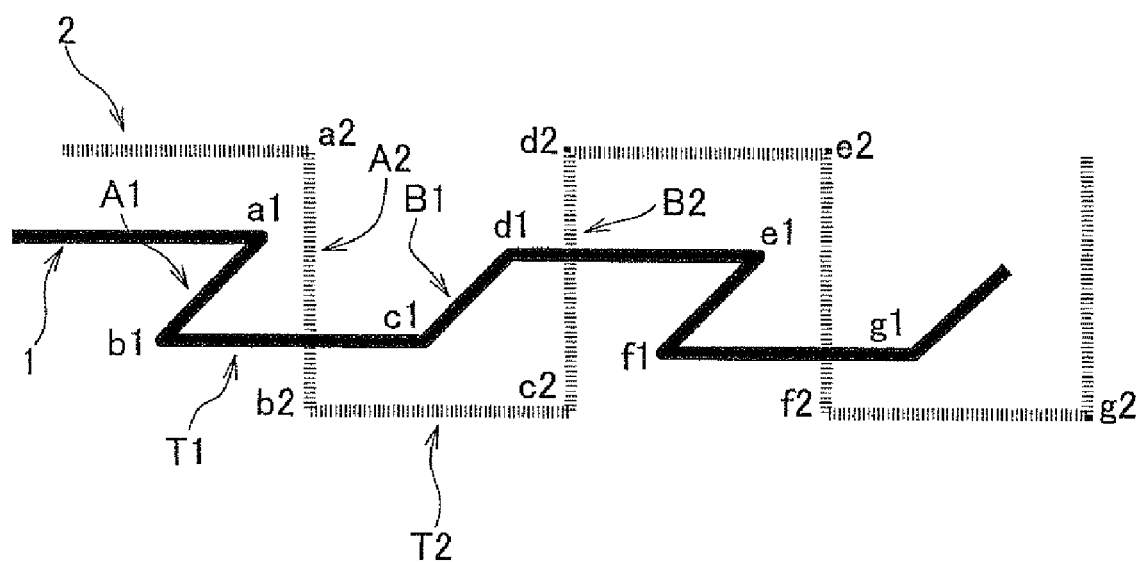
FIG. 8 is a diagram for explaining the concept of the invention.

Next, the structure of the coil assembly 20 is explained. FIG. 3 is a perspective view showing an external appearance of the coil assembly 20. FIG. 4 is a front view showing a coil end portion of the coil assembly 20. FIG. 5 is a front view showing the overall shape of a coil wire 30. FIG. 6 is a cross-sectional view of the coil wire 30. FIG. 7 is a perspective view showing the shape of a turn portion 42 of the coil wire 30.

As shown in FIG. 5, each of the coil wires 30 constituting the coil assembly 20 includes a plurality of turn portions 42 width a predetermined pitch. Each coil wire 30 has a length of approximately 3 m. As shown in FIG. 6, the coil wire 30 is constituted by a copper conductor 32, and an insulating film formed of an inner layer 32 insulatively covering the outer surface of the conductor 32 and an outer layer 36 covering the outer surface of the inner layer 34. The thickness of the insulating film is between 100 μm-200 μm. Since the insulating film is sufficiently thick, it is not necessary to interpose insulating paper or the like between the coil wires 30 for insulation therebetween.

The outer layer 36 is made of insulating material, and the inner layer 34 is made of thermoplastic resin having a glass transition temperature higher than that of the outer layer 36, or insulating material having no glass transition temperature such as polyamideimide. Accordingly, since the outer layer 36 softens earlier than the inner layer 34 by the heat generated in the electric rotating machine, the coil wires 30 disposed in the same slot 14 adhere to one another at their outer layers 36. As a result, since the coil wires 30 disposed in the same slot 14 become integrated and rigid, the mechanical strength of the coil wires 30 increases. In addition, if excessive vibration occurs, since adhered portions between the inner layer 34 and the outer layer 36 come off earlier than adhered portions between the inner layer 34 and the conductor 32, adhesion between the inner layer 34 and the conductor 32 can be maintained to thereby maintain insulation between the coil wires 30.

As shown in FIG. 2, the coil wire 30 includes in-slot portions 40 accommodated in the slots 14 and 15 of the stator core 12, and the turn portions 42 projecting from the slots 14 and 15 and connecting the in-slot portions 40 accommodated indifferent slots. The coil wire 30 is wave-wound on the stator core 12 to form a stator winding (coil assembly 20). The turn portions 42 are located on both axial sides of the stator core 12. The odd-numbered turn portions 30 and the even-numbered turn portions 30 of the coil wire 30 are displaced with each other by 180 degrees in phase.

As shown in FIG. 7, the turn portion 42 is formed with a crank part 44 with no twist at its approximate center. The crank part 44 is formed in a crank shape along an end surface 13 (see FIG. 1) of the stator core 12. The crank height of the crank part 44 due to its crank shape is approximately the width of the coil wire 30. This makes it possible to thickly wind the turn portions 42 of the radially adjacent coil wires 30. As a result, since the radial width of the coil end can be made small, it becomes possible to prevent the coil assembly 20 from projecting radially outwardly.

The turn portion 42 of the coil wire 30 is further formed with a crank part 46 along the axial end surface 13 at its both projecting positions from which the turn portion 42 projects outwardly from the slots in which the in-slot portions of the coil wire 30 are accommodated. Therefore, the distance between the projecting positions of the turn portion 42 of the coil wire 30 (that is, the length of the base of a triangle formed by the turn portion 42) is smaller than the slots in which the in-slot portions of the coil wire 30 are accommodated. This makes it possible to reduce the height h of the coil end.

When the length of the crank part 46 along the end surface 13 of the stator core 12 is d1, and the interval (pitch) of the slots is d2, the relationship of d1≦d2 holds. This makes it possible to prevent interference between the crank part 46 of the coil wire 30 and another coil wire 30 projecting from the circumferentially adjacent slot. Accordingly, it becomes unnecessary to increase the height of the coil end or to increase the radial width of the coil end to prevent the interference.

The coil wire 30 is further formed with two crank parts 48 between the crank part 44 and one of the crank parts 46 and between the crank part 44 and the other of the crank parts 46. That is, the turn portion 42 of the coil wire 30 on the side of one of the axial end surfaces 13 is formed with 7 crank parts in total. As a result, the height of the turn portion 42 can be made short compared to conventional cases where the turn portion of a triangular shape is not formed with such crank parts. Each crank part 48 has a crank shape along the end surface 13 of the stator core 12 like the crank parts 44 and 46. Accordingly, the turn portion 42 of the coil wire 30 has step-like portions opposed across the crank part 44.

The coil wire 30 is disposed in two of the slots 14 and 15 for each phase and for each magnetic pole.

Hence, the number of the slots of the coil assembly 20 per one magnetic pole is 6 (=3×2). Accordingly, since each coil wire 30 is disposed in one of every 6 slots arranged in the circumferential direction, it is preferable that the turn portion 42 is formed with 7 (=3×2+1) crank parts including the crank part 44 located in its center to prevent the interfere between the coil wires 30 projecting from the circumferentially adjacent slots.

Next, a method of manufacturing the above described coil assembly 20 is described with reference to FIGS. 9 to 24. Preferably, the coil assembly 20 is formed by interlacing 12 coil wires while shaping them. However, the following description is made for the case where the coil assembly 20 this formed of six coil wires (first to sixth coil wires) for ease of explanation.

Each of FIGS. 9 to 24 shows a cylindrical coil guide 8 in which the first to sixth coil wires 1 to 6 are set when viewed respectively from two different points obliquely upward from the coil guide 8. In each of FIGS. 9 to 24, the solid line denotes the first coil wire 1, the longer dashed line denotes the second coil wire 2, the gray line denotes the third coil wire 3, the shorter dashed line denotes the fourth core wire 4, the chain line denotes the fifth coil wire 5, and the chain double-dashed line denotes the sixth coil wire 6.

Figure 9:
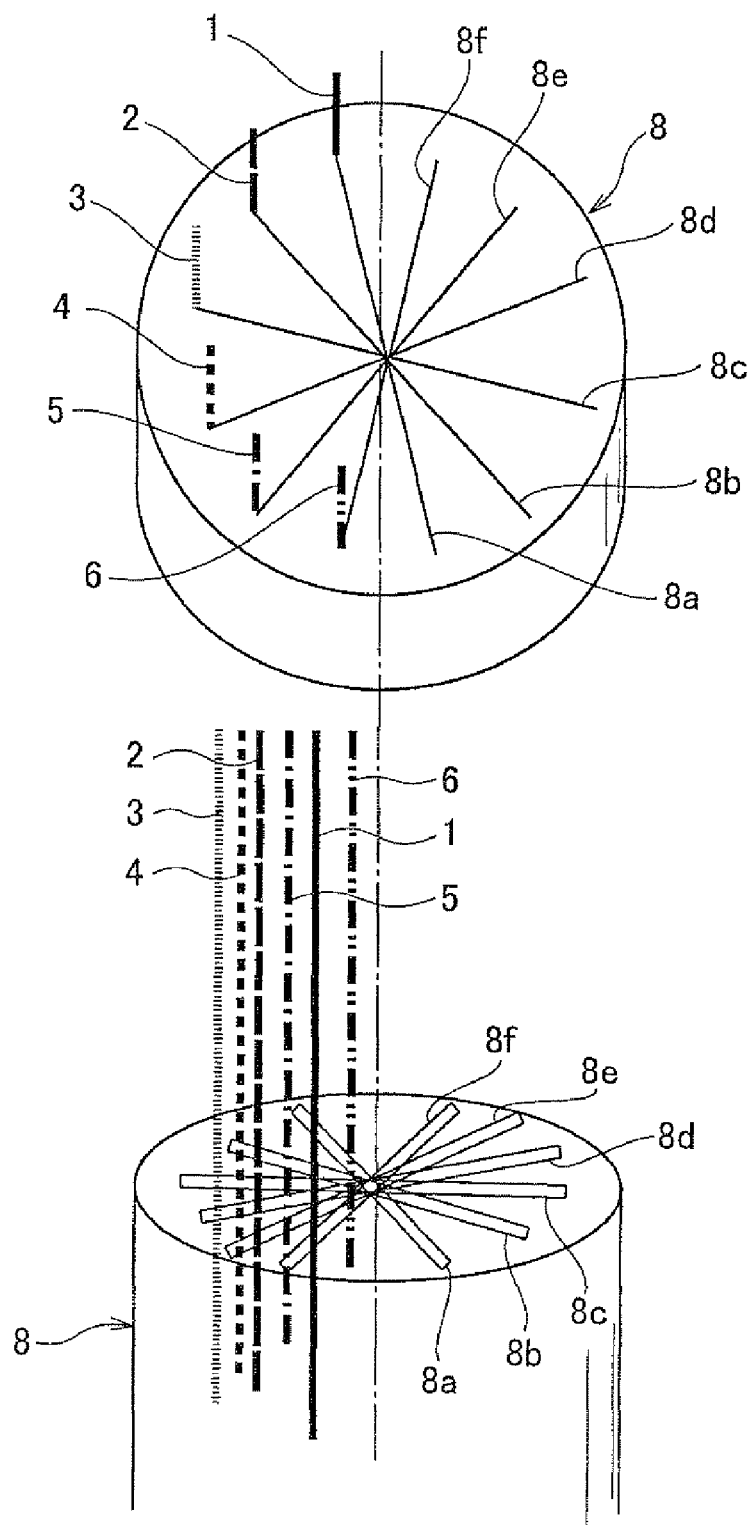
FIG. 9 is an explanatory view for explaining a setting step of the manufacturing method according to the embodiment of the invention.

This method includes a setting step and first to fourth shaping steps performed sequentially. This method further includes a crank forming step performed during the first to fourth shaping steps. In the setting step, as shown in FIG. 9, the straight first to sixth coil wires 1 to 6 held at their both ends are disposed in parallel to one another with a certain distance therebetween in the circumferential direction. In this state, the first to sixth coil wires 1 to 6 are respectively inserted into 6 guide passages 8a to 8f formed axially penetrating through the cylindrical coil guide 8 in the longitudinal axial direction of the coil guide.

Each of the guide passages 8a to 8f has a slim rectangular cross section in the direction perpendicular to the longitudinal axis of the coil guide 8, which extends in the radial direction of the coil guide 8 with a width slightly larger than the thickness (width) of the coil wires 1 to 6. The guide passages 8a to 8f intersect with one another at their center portions. The first to sixth coil wires 1 to 6 are inserted respectively into the guide passages 8a to 8f in such a state that they are situated on the radially outer sides of the guide passages 8a to 8f.

Figure 10:
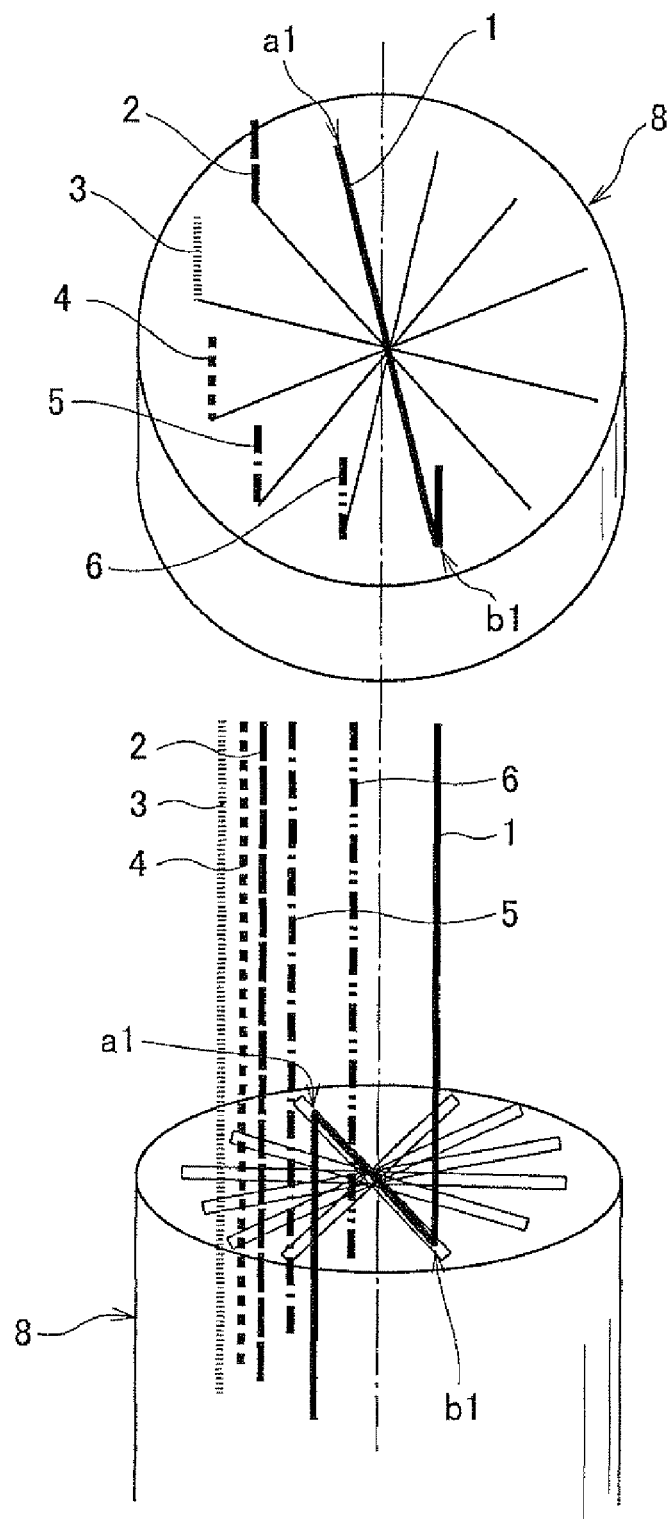
FIGS. 10 to 11 are explanatory views for explaining a first shaping step of the manufacturing method according to the embodiment of the invention.

As shown in FIG. 10, in the first shaping step, the first coil wire 1 is bent at approximately a right angle along the radial direction of the coil guide 8 at a predetermined portion a1 thereof, and also bent at approximately a right angle along the axial direction of the coil guide 8 (toward the upward direction in FIG. 10) at a predetermined portion b1 thereof which is distant from the portion a1 by a predetermined distance. As a result, a first in-slot portion A1 is formed between the portions a1 and the b1. Although the first coil wire 1 is bent at approximately a right angle at each of the portions a1 and the b1 in this embodiment, the bending angle may be varied as necessary if the sum of the bending angles at the portions a1 and b1 is equal to 180 degrees so that portions of the coil wire 1 situated respectively inside and outside the coil guide 8 extend in the same direction. This applies also to the second and following shaping steps.

Figure 11:
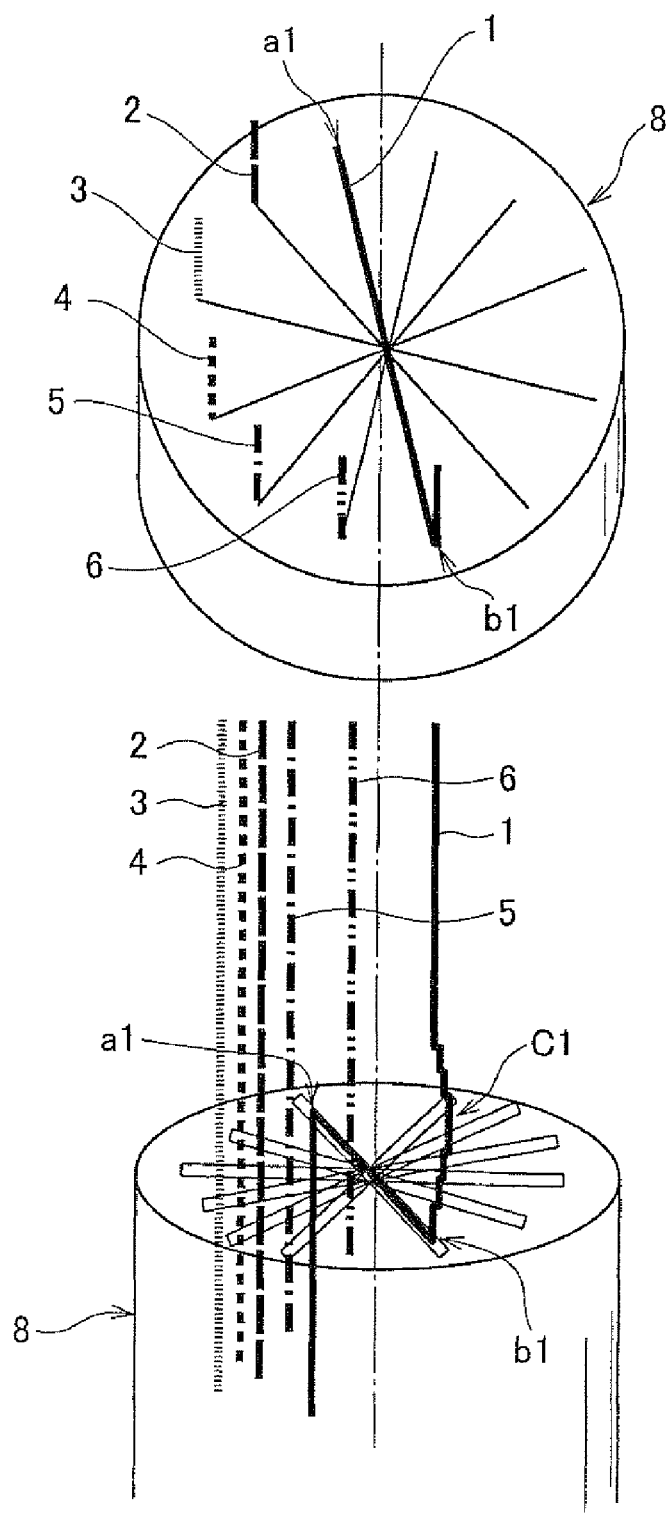
Figure 12:
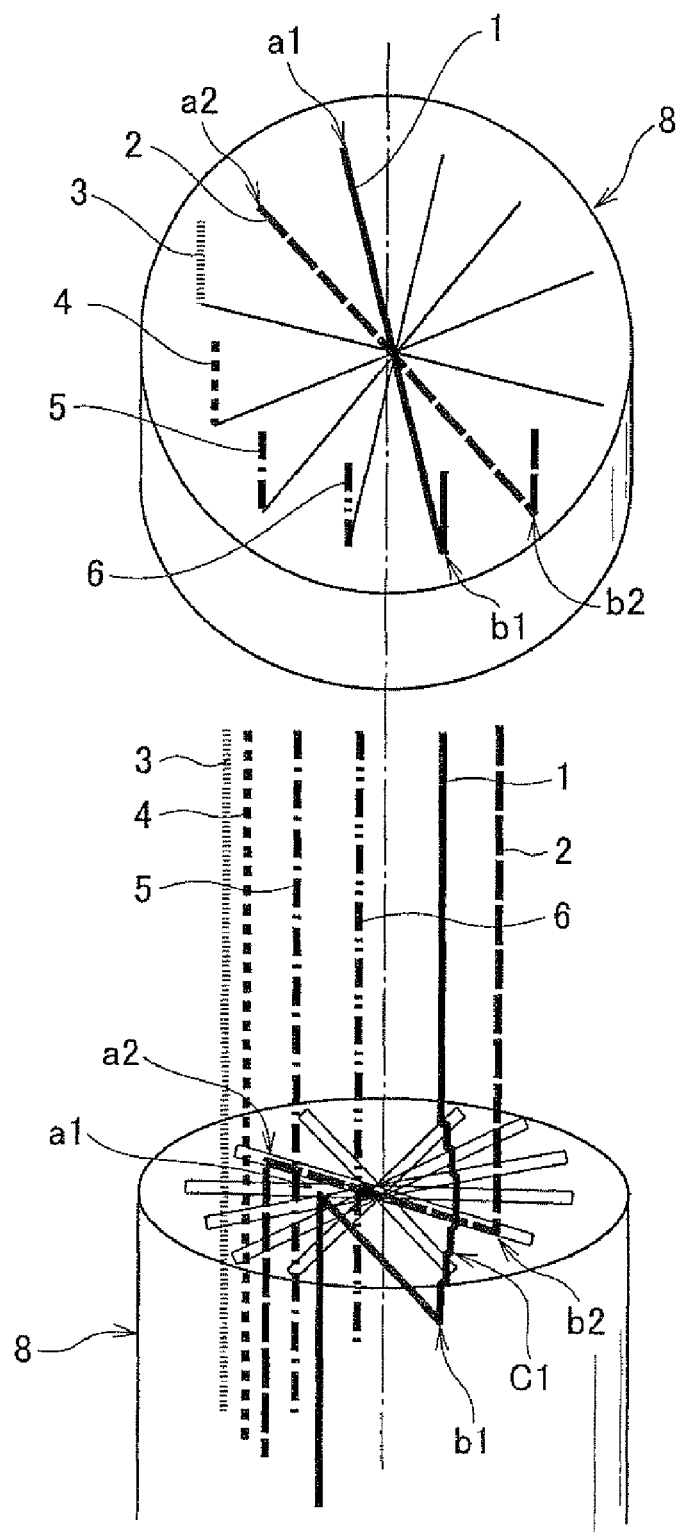
FIGS. 12 to 21 are explanatory views for explaining a second shaping step of the manufacturing method according to the embodiment of the invention.

Subsequently, as shown in FIG. 11, the portion of the first coil wire 1 upwardly projecting from the coil guide 8 is subjected to the crank part forming process to form a step-like crank part C1. Thereafter, the first coil wire 1 is fed downwardly into the coil guide 8 by a predetermined distance.

Figure 13:
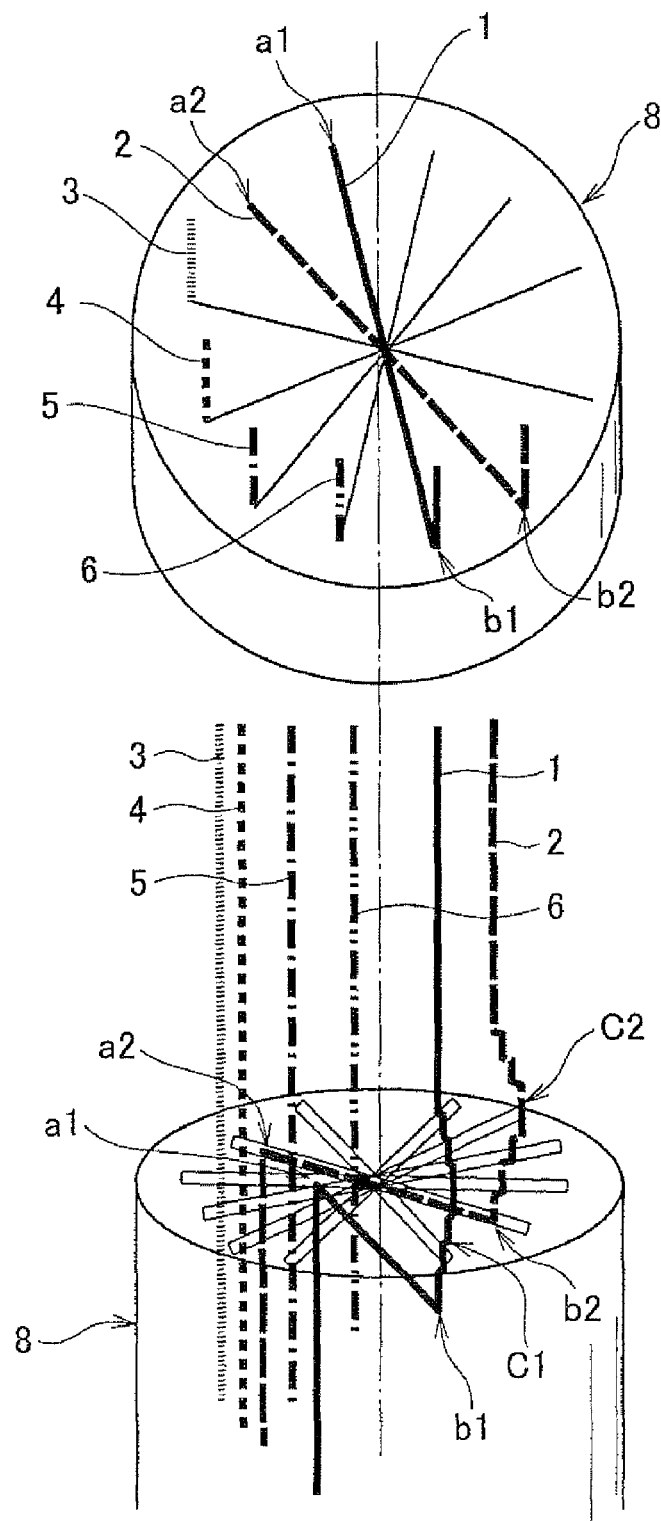
Figure 14:
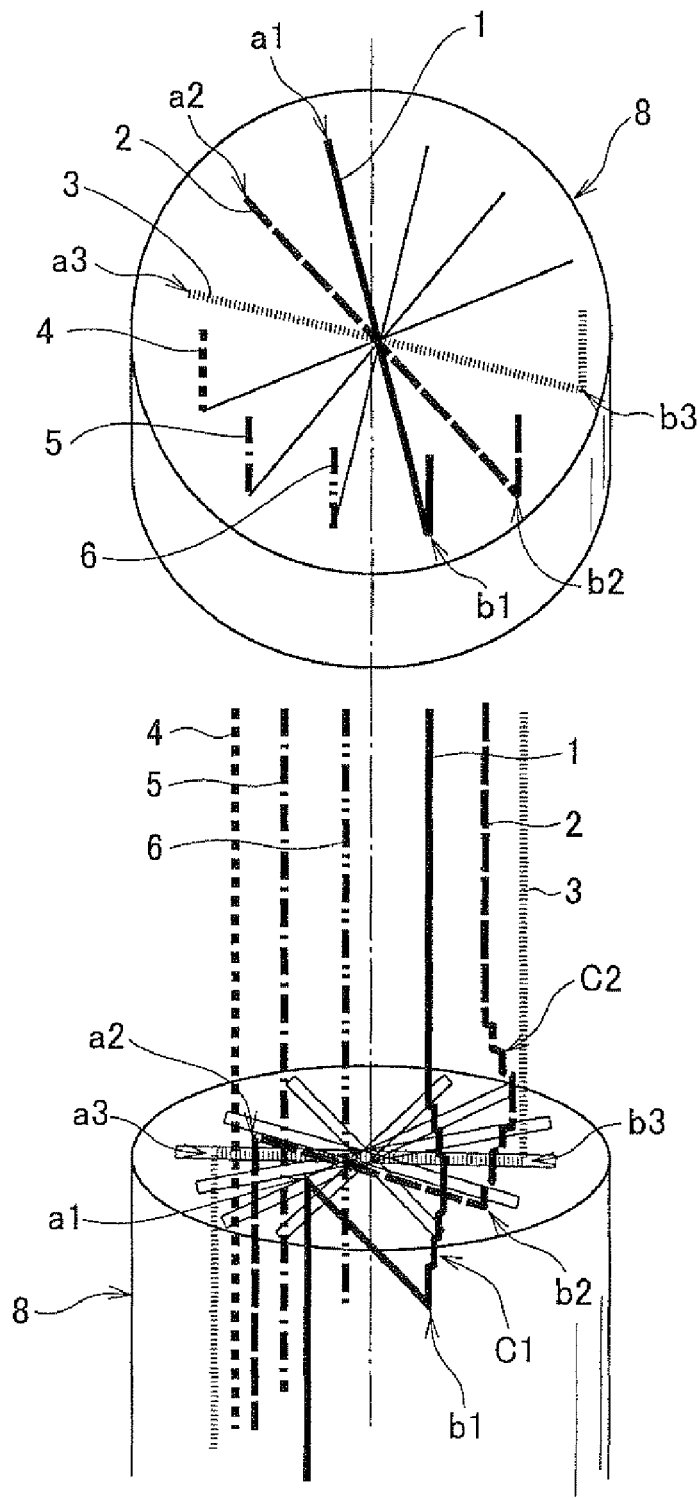
Figure 15:
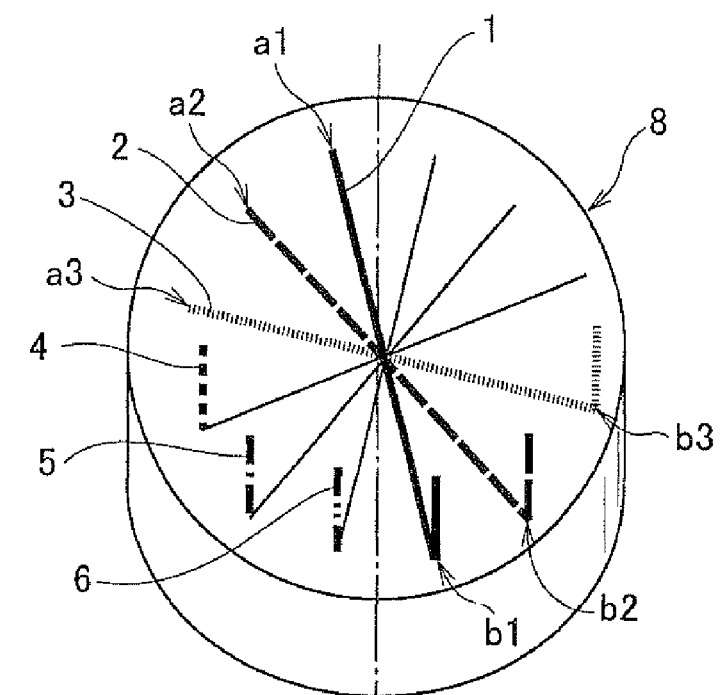
Figure 15:
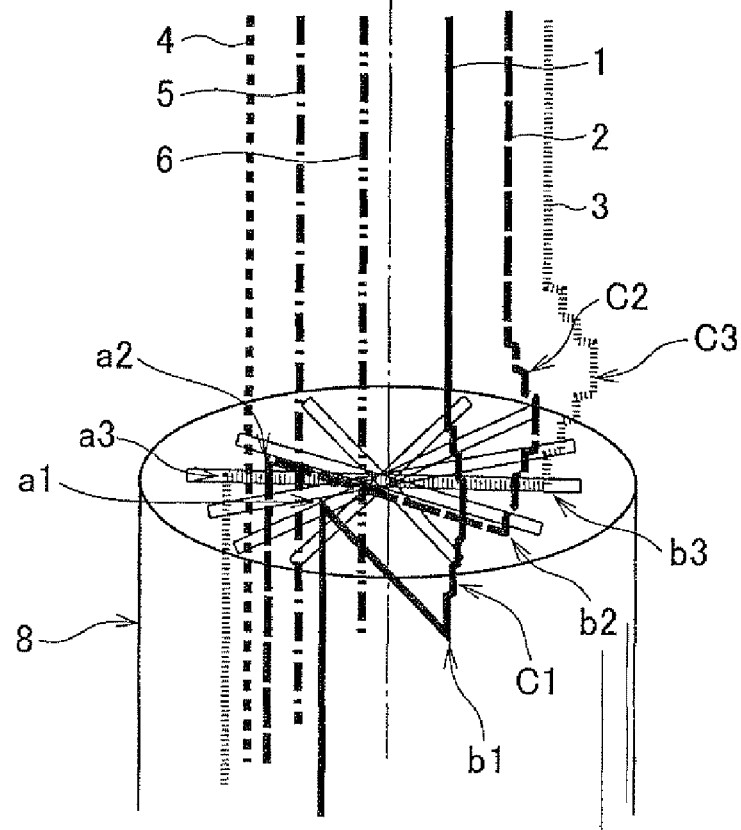
Figure 16:
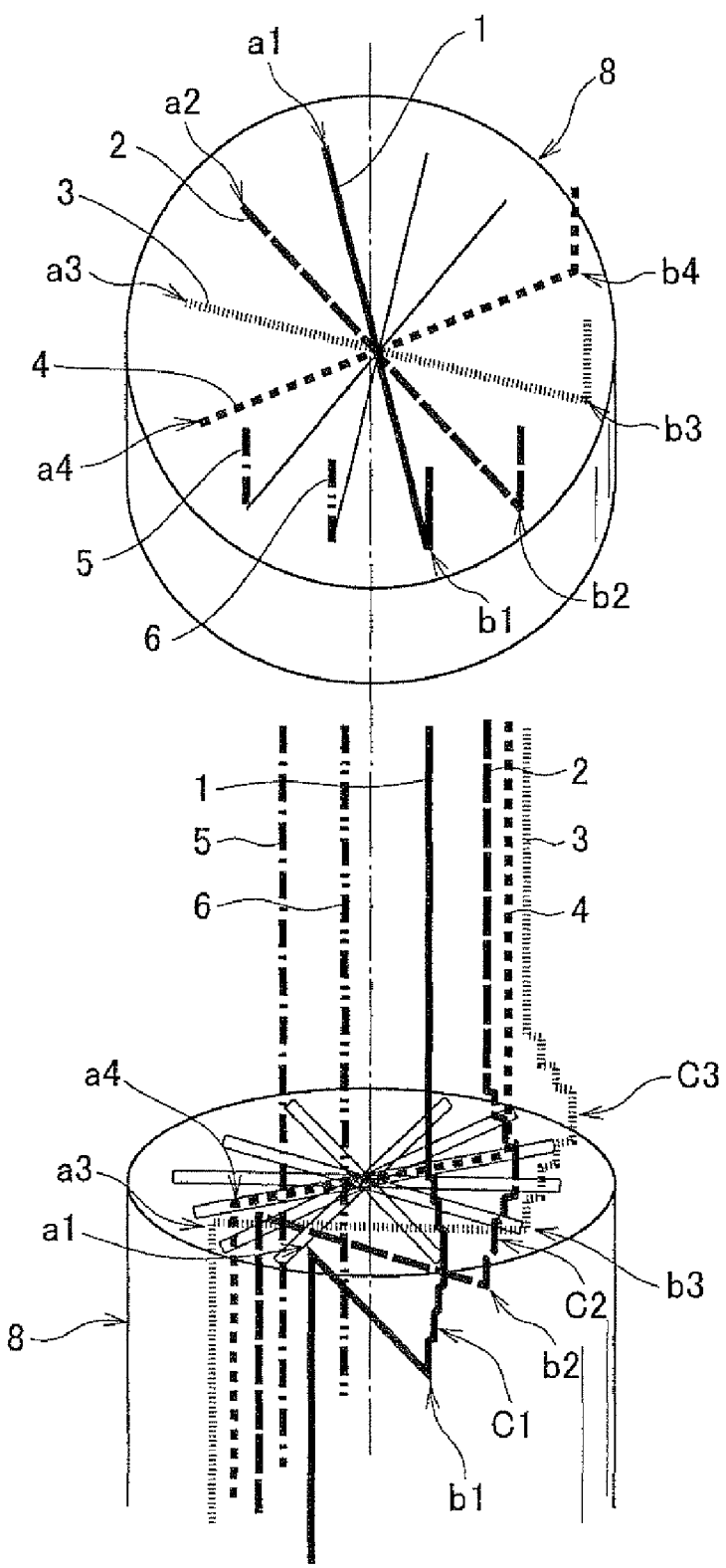
Figure 17:
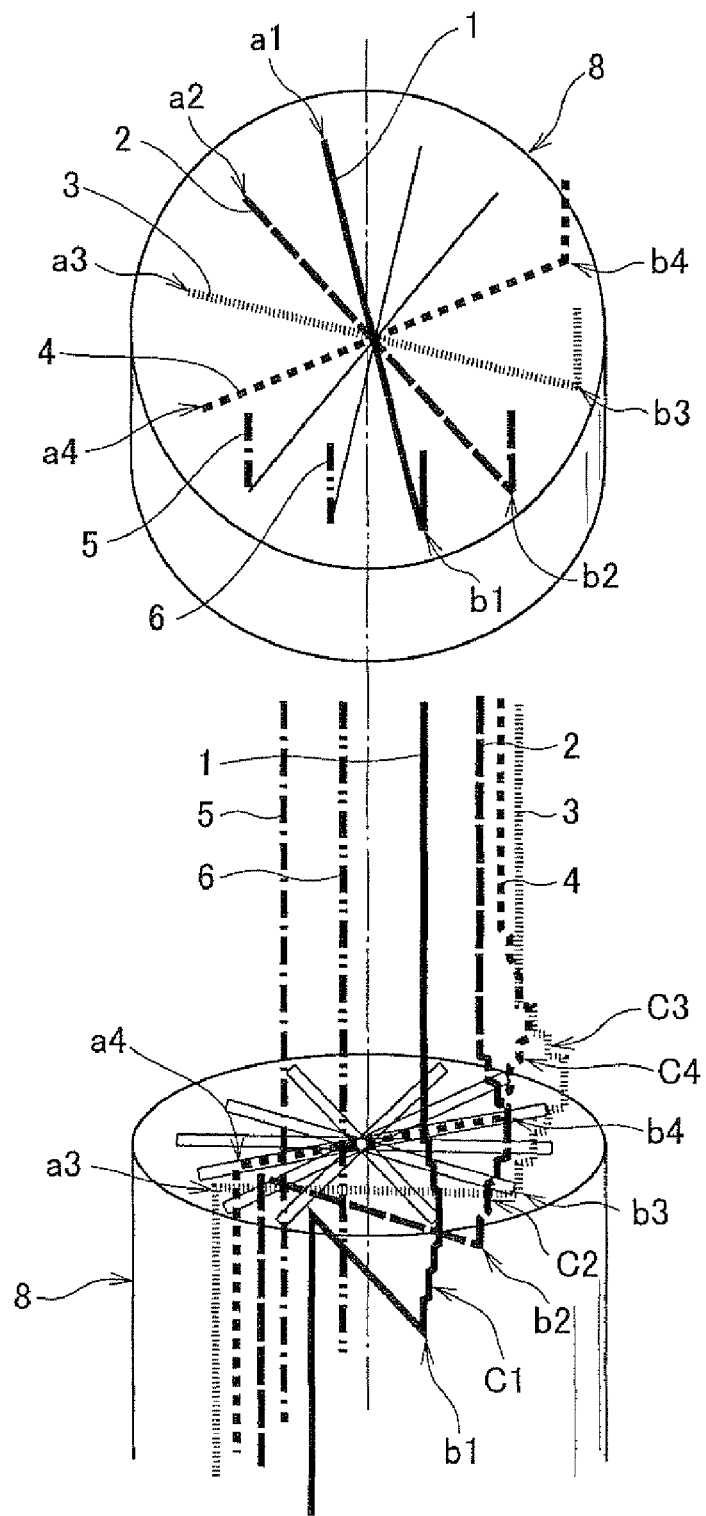
Figure 18:
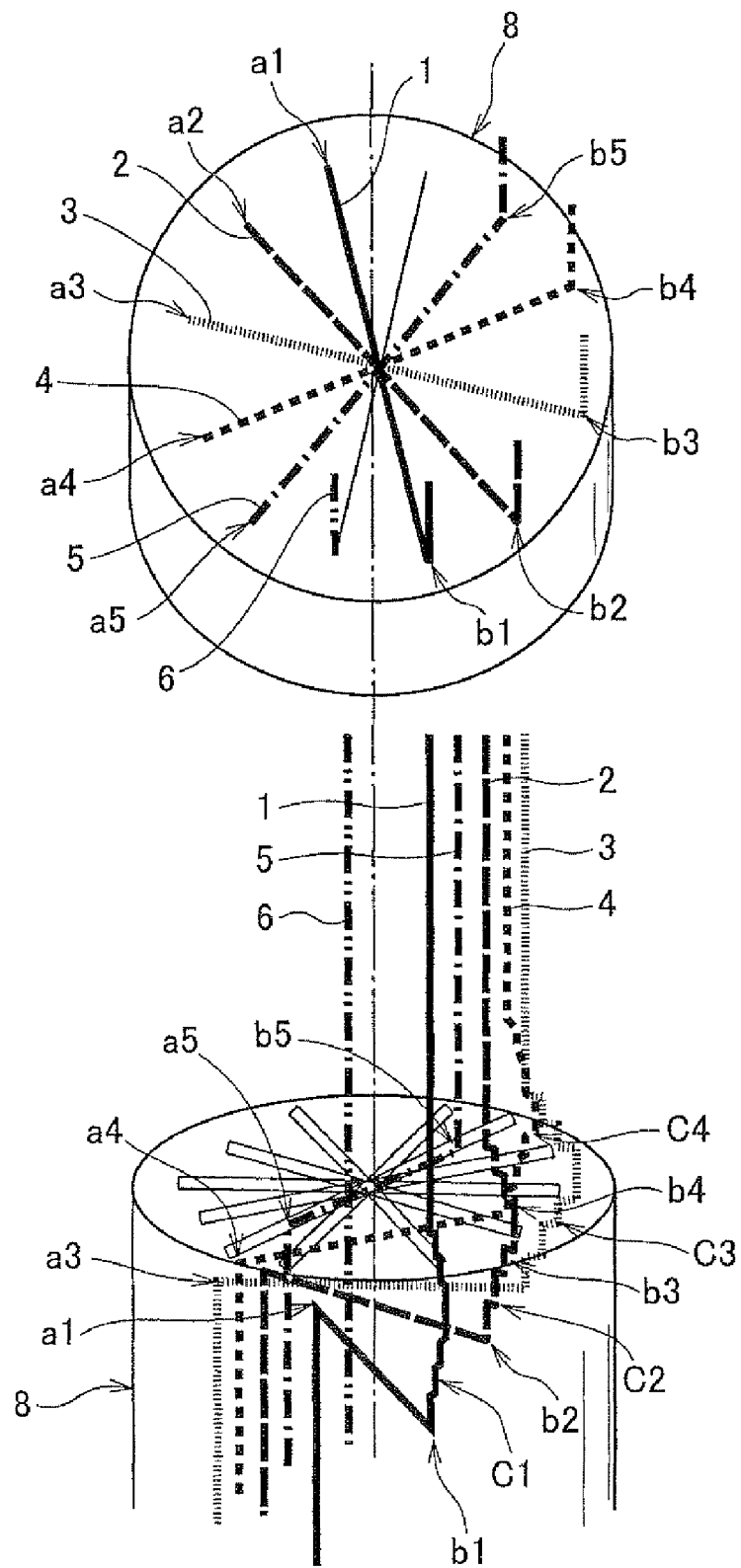
Figure 19:
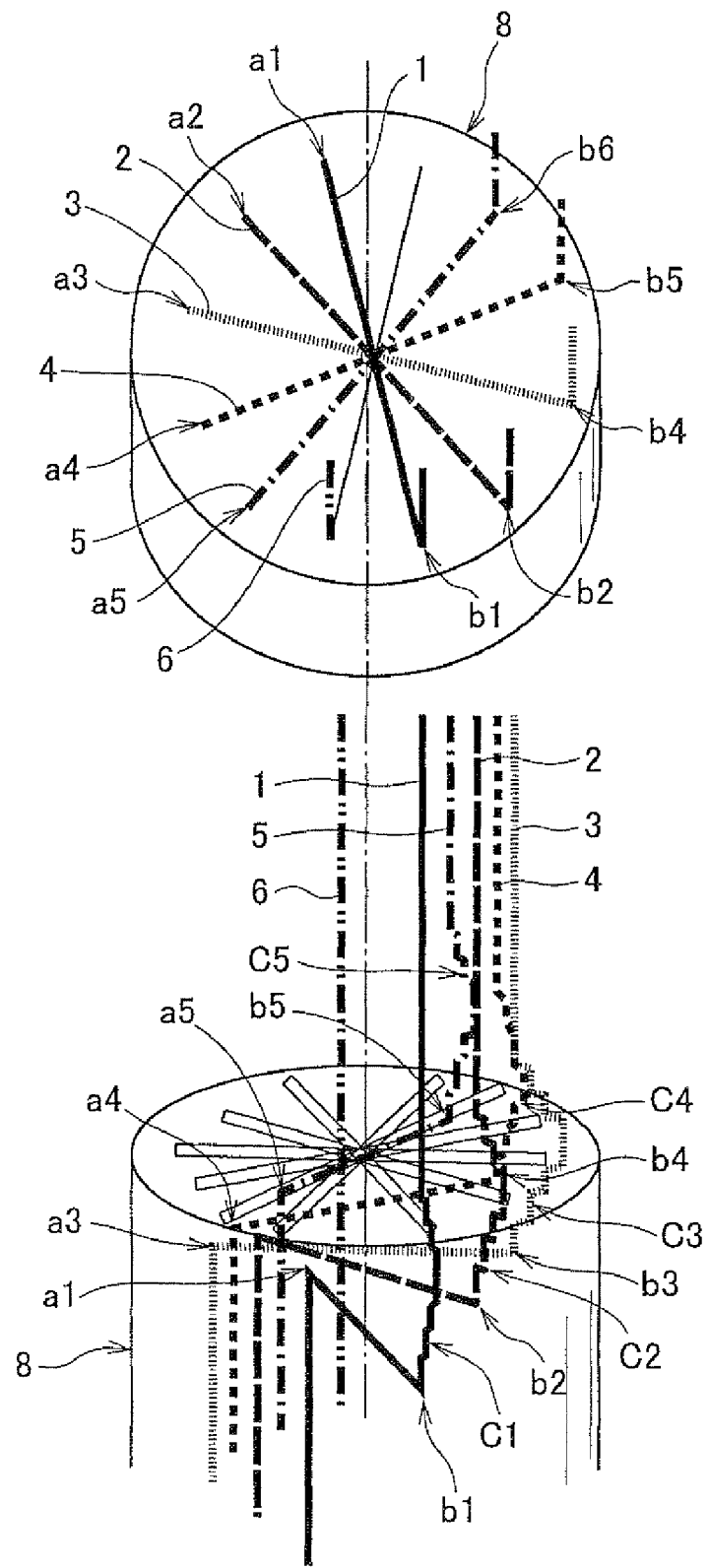
Figure 20:
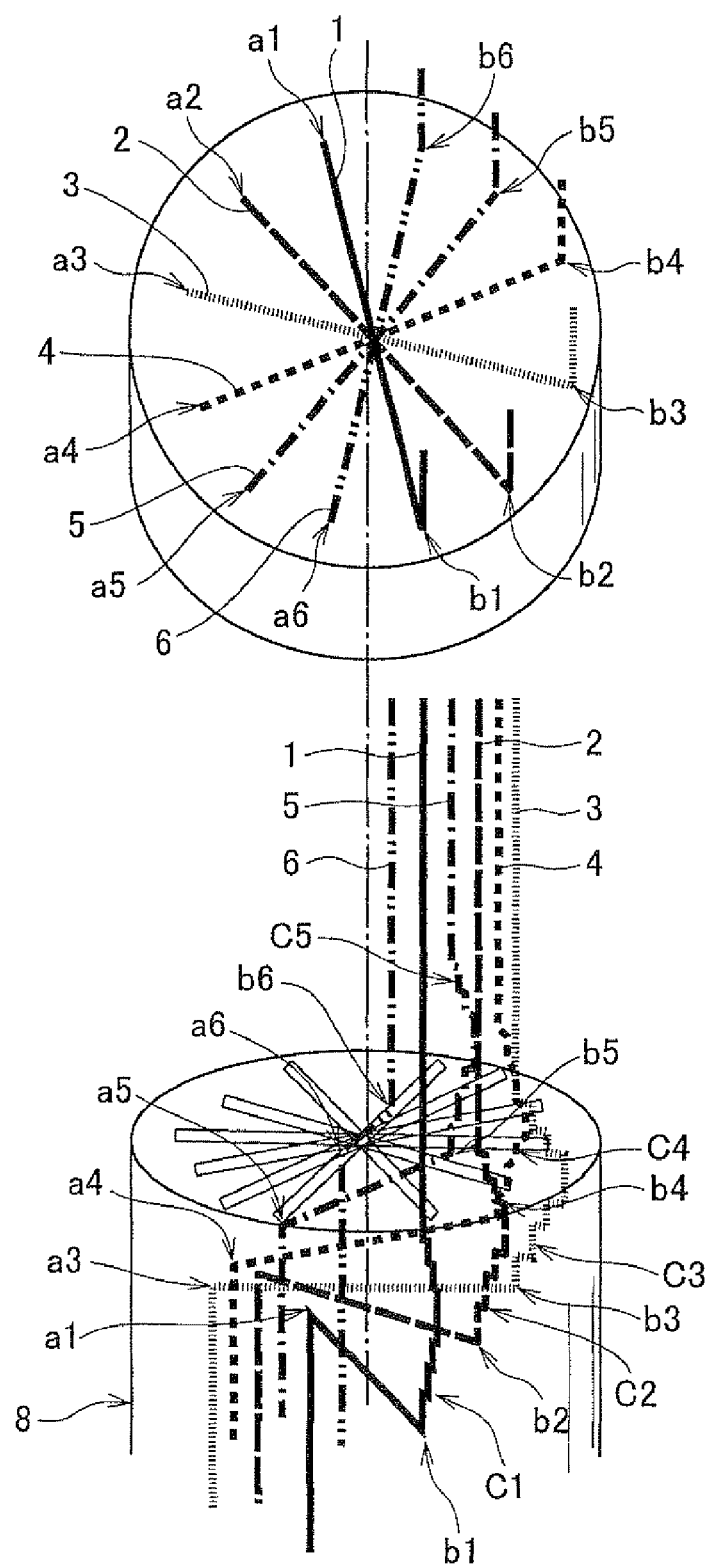
Figure 21:
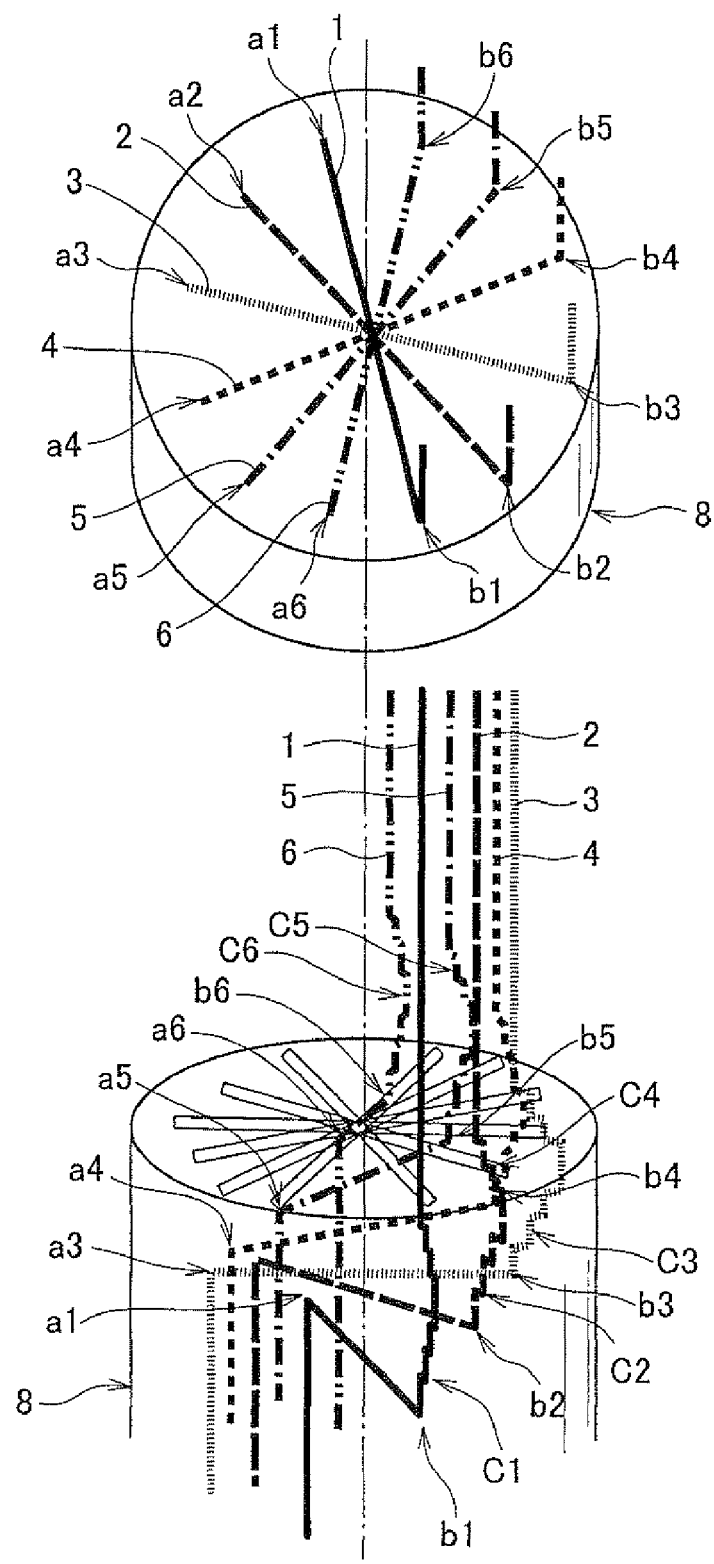

In the second shaping step, as shown in FIG. 2, the second coil wire 2 is bent at approximately a right angle along the radial direction at a portion a2 thereof which is axially offset from the portion a1 of the first coil wire 1, and also bent at approximately a right angle along the axial direction at a predetermined portion b2 thereof which is distant from the portion a2 by a predetermined distance. As a result, a first in-slot portion A2 is formed between the portions a2 and b2. Subsequently, as shown in FIG. 13, the portion of the second coil wire 2 upwardly projecting from the coil guide 8 is subjected to the crank part forming process to form a step-like crank part C2. Thereafter, the first and second coil wires 1 and 2 are fed downwardly into the coil guide 8 by a predetermined distance.

Subsequently, the third to sixth coil wires 3 to 6 are sequentially subjected to the same shaping step and the crank part forming step as performed on the second coil wire 2 to form first in-slot portions A3 to A6 and crank parts C3 to C6 in the third to sixth coil wires 3 to 6 (see FIGS. 14 to 21). In these steps, as explained above, the coil wire having been subjected to the crank part forming step is downwardly fed into the coil guide 8 together with the coil wires already subjected to the crank part forming step by a predetermined distance.

Accordingly, the offset distances of the portions a2 to a6 of the second to sixth coil wires from the portion a1 of the first coil wire increase in this order. The axial distances between the portions a1 and a2, between the portions a2 and a3, between the portions a3 and a4, between the portions a4 and a5, and between the portions a5 and a6 are determined depending on the pitch of the slots formed in the stator 10. Thereafter, the third shaping step is performed.

Figure 22:
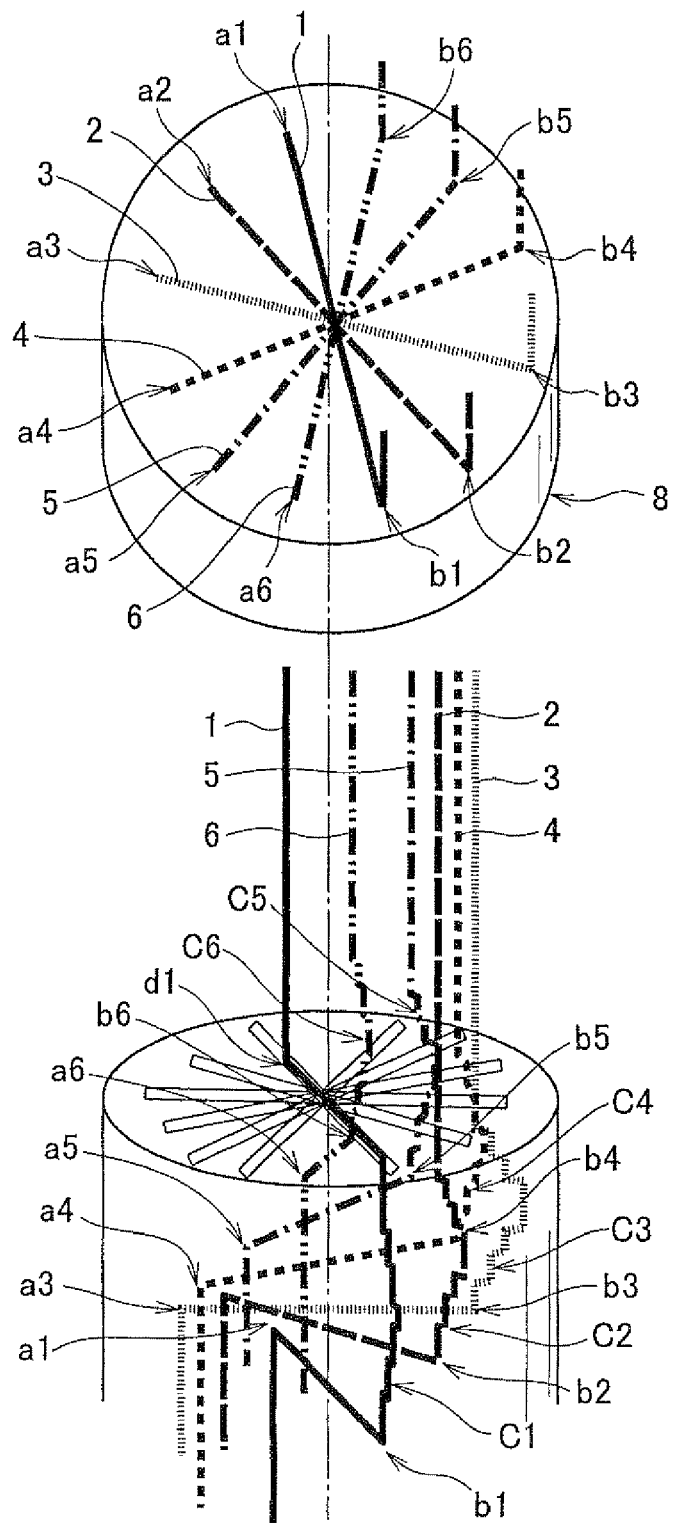
FIGS. 22 to 23 are explanatory views for explaining a third shaping step of the manufacturing method according to the embodiment of the invention.

As shown in FIG. 22, in the third shaping step, the first coil wire 1 is bent at approximately a right angle along the radial direction at a portion c1 thereof toward the side of the portion a1, and also bent at approximately a right angle along the axial direction at a portion d1 which is distant from the portion c1 by a predetermined distance. As a result, a second in-slot portion B1 is formed between the portions c1 and d1. The portions c1 and d1 of the first coil wire 1 is situated axially above the portions 6a and 6b of the sixth coil wire 6. Accordingly, the first in-slot portions A2 to A6 of the second to sixth coil wires 2 to 6 are situated between the first-in slot portion A1 and the second in-slot portion B1 of the first coil wire 1. Between the portions b1 and c1 of the first coil wire 1, a turn portion T1 is formed. The turn portion T1 has the step-like crank part C1 formed in the foregoing crank part forming step.

Figure 23:
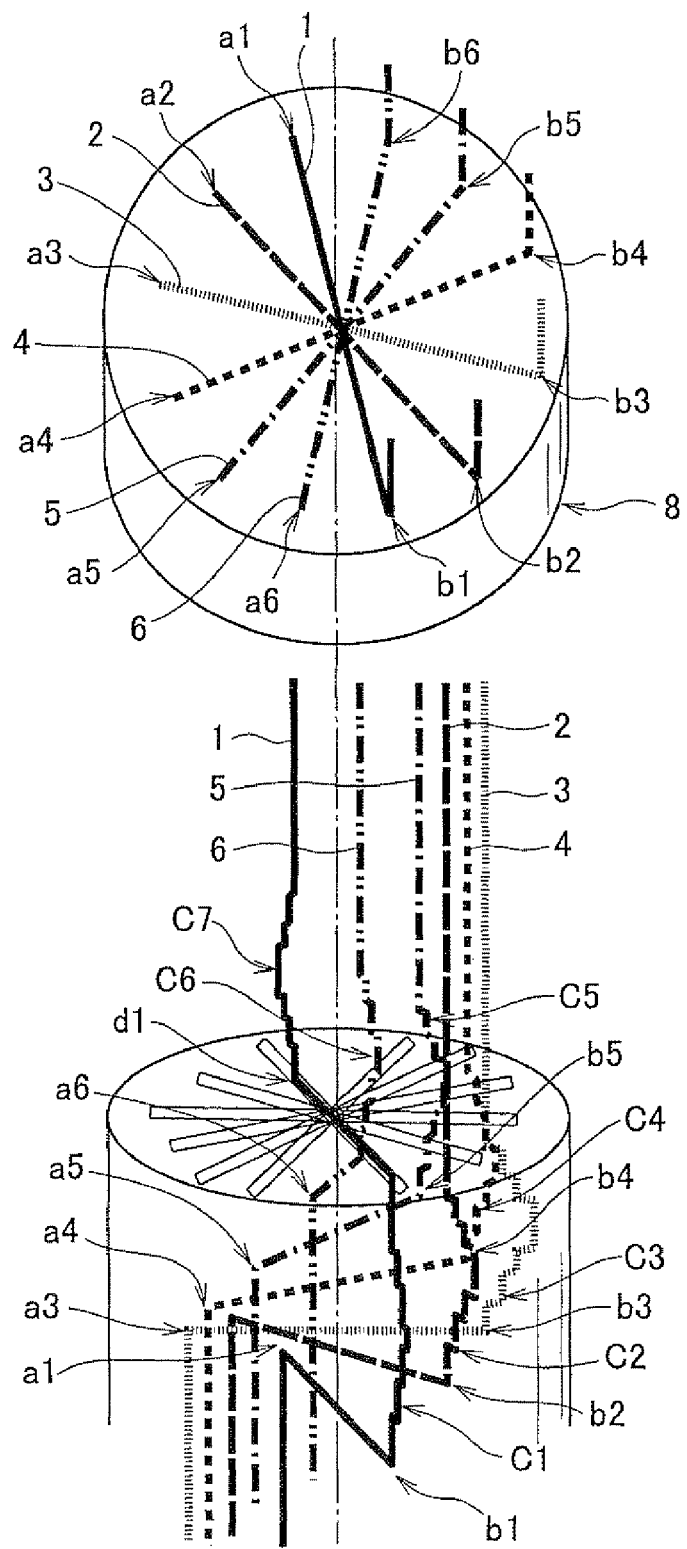
Figure 24:
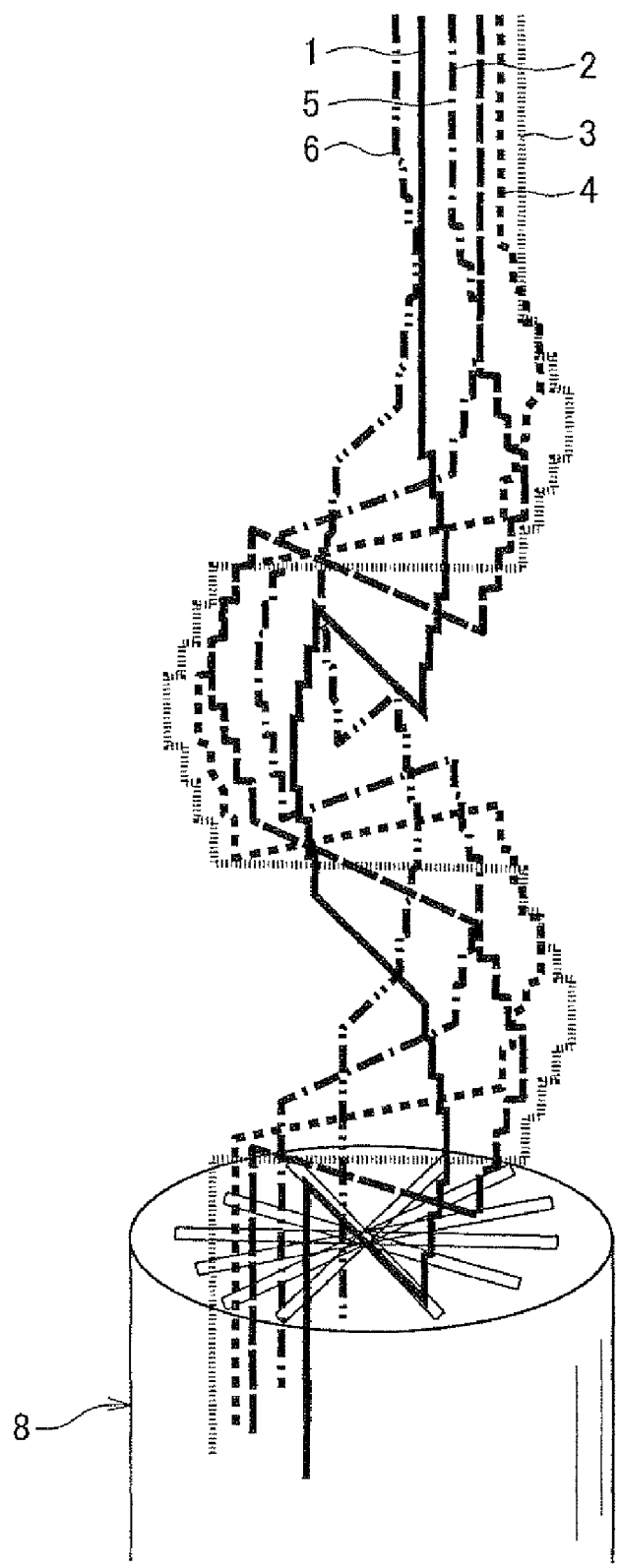
FIG. 24 is an explanatory view for explaining a fourth shaping step of the manufacturing method according to the embodiment of the invention.

Subsequently, as shown in FIG. 23, the portion of the first coil wire 1 upwardly projecting from the coil guide 8 is subjected to the crank part forming process to form a step-like crank part C7. Thereafter, the first coil wire 1 is downwardly fed into the coil guide 8 together with the second to sixth coil wires 2 to 6 by a predetermined distance.

In the fourth shaping step, the second coil wire 2 is bent at approximately a right angle along the radial direction at a portion c2 thereof which is axially offset from the portion c1 of the first coil wire 1, and also bent at approximately a right angle along the axial direction at a predetermined portion d2 thereof which is distant from the portion c2 by a predetermined distance. As a result, a second in-slot portion B2 is formed between the portions c2 and d2. Between the portions b2 and c2 of the second coil wire 2, a turn portion T2 is formed. The turn portion T2 has the step-like crank part C2 formed in the foregoing crank part forming step.

Subsequently, the third to sixth coil wires 3 to 6 are sequentially subjected to the same shaping step and the crank part forming state as performed on the second coil wire 2 to form first in-slot portions B3 to B6 and crank parts C3 to C6 in the third to sixth coil wires 3 to 6. In theses steps, as explained above, the coil wire having been subjected to the crank part forming step is downwardly fed into the coil guide 8 together with the coil wires already subjected to the crank part forming step by a predetermined distance. Accordingly, the offset distances of the portions c2 to c6 of the second to sixth coil wires from the portion c1 of the first coil wire increase in this order. The axial distances between the portions c1 and c2, between the portions c2 and c3, between the portions c3 and c4, between the portions c4 and c5, and between the portions c5 and c6 are determined depending on the pitch of the slots formed in the stator 10.

After completion of the fourth shaping step, the first to fourth shaping steps are repeated. As a result, the first to sixth coil wires 1 to 6 are shaped in a predetermined shape including in-slot portions and turn portions along their entire lengths with the turn portions of the first to sixth coil wires 1 to 6 being interlaced. Thereafter, the first to sixth coil wires 1 to 6 are turned and translated so that the turn portions of the first to sixth coil wires 1 to 6 cross and overlap one another properly, the ends of the first to sixth coil wires 1 to 6 are joined to one another properly, and finally, the first to sixth coil wires 1 to 6 having been interlaced are shaped into a doughnut shape to complete the coil assembly 20.

As explained above, according to this embodiment in which the first to sixth coil wires 1 to 6 set in a predetermined positional relationship by the setting step are sequentially subjected to the first to fourth shaping steps, it is possible to form the first to sixth coil wire 1 to 6 in a predetermined shape including in-slot portions and turn portions, and at the same to interlace the turn portions of the first to sixth coil wires 1 to 6. Accordingly, since the shaping steps and weaving steps of the first to sixth coil wires 1 to 6 can be integrated, not only the number of the steps can be reduced, but also deformation of the coil wires which may occur when the weaving step is performed separately can be prevented.

In this embodiment, the first in-slot portions A2 to A6 of the second to sixth coil wires 2 to 6 are formed so as to cross the first coil wire 1 within the length of the in-slot portion A1 of the first coil wire 1. Accordingly, since the first in-slot portions A2 to A6 of the second to sixth coil wires 2 to 6 are situated within the length of the in-slot portion A1 of the first coil wire 1, the second to sixth coil wires 2 to 6 can be woven into the first coil wire 1 easily.

The second to fourth shaping steps are performed first for the second coil wire 2 adjacent to the first coil wire 2, and then for the other coil wires in the order of being close to the second coil wire 2. Accordingly, since weaving of the second to sixth coil wires 2 to 6 into the first coil wire 1 are performed orderly, irregularity can be prevented from occurring during the weaving.

The offset distances of the portions a2 to a6 of the second to sixth coil wires 2 to 6 with respect to the portion a1 of the first coil wire 1 are set in accordance with the pitch of the slots. Accordingly, since the in-slot portions of the first to sixth coil wires 1 to 6 are formed so as to positionally correspond to the slots formed in the stator 10, the in-slot portions of the first to sixth coil wires 1 to 6 can be accommodated in the corresponding slots with ease.

This embodiment includes the crank part forming step to form the crank parts C in the turn portions of the first to sixth coil wires 1 to 6. Since the crank parts are formed in the shape to enable reducing the height and the radial width of the coil end, the coil assembly 20 can be made compact.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a coil assembly of a stator of an electric rotating, machine constituted by a plurality of interlaced coil wires each including a plurality of in-slot portions and a plurality of turn portions each of which connects adjacent two of said in-slot portions, said method comprising:

a setting step of, for an integer n greater than or equal to 2, setting first to n-th coil wires such that said first to n-th coil wires extend straight in an axial direction perpendicular to a predetermined circle and spaced from one another along a circumferential direction of said circle;

a first shaping step of bending said first coil wire at a first portion thereof along a predetermined direction, and at a second portion thereof distant from said first portion by a predetermined distance so as to extend along said axial direction, to thereby form a first in-slot portion in said first coil wire;

a second shaping step of sequentially bending said second to n-th coil wires at respective first portions thereof which are offset in said axial direction from said first portion of said first coil wire so as to intersect with said first in-slot portion of said first coil wire, and at respective second portions thereof distant respectively from said first portions of said second to n-th coil wires by a predetermined distance so as to extend along said axial direction, to thereby form respective first in-slot portions in said second to n-th coil wires;

a third shaping step of bending said first coil wire at a third portion thereof distant from said second portion of said first coil wire by a predetermined distance toward said first portion of said first coil wire, and at a fourth portion thereof distant from said third portion of said first coil wire by a predetermined distance so as to extend along said axial direction to thereby form a second in-slot portion in said first coil wire; and a fourth shaping step of sequentially bending said second to n-th coil wires at respective third portions thereof which are offset in said axial direction from said first portion of said first coil wire so as to intersect with said second in-slot portion of said first coil wire, and at respective fourth portions thereof distant respectively from said third portions of said second to n-th coil wires by a predetermined distance so as to extend along said axial direction, to thereby form respective second in-slot portions in said second to n-th coil wires.

2. The method according to claim 1, wherein said first in-slot portions of said second to n-th coil wires intersect with said first coil wire within the length of said first in-slot portion of said first coil wire.

3. The method according to claim 1, wherein each of said second and fourth shaping steps bends said second to n-th coil wires in order from said second coil wire, being closest to said first coil wire, to said n-th coil wire.

4. The method according to claim 1, wherein offset distances between said first portion of said first coil wire and said first portion of each of said second to n-th coil wires are determined depending on the pitch of slots formed in said stator of said electric rotating machine.

5. The method according to claim 1, further comprising a crank part forming step of forming a crank part in a turn portion between said first and second in-slot portions of each of said first to n-th coil wires.

* * * * *